(12) United States Patent
Zhao

(10) Patent No.: US 10,034,338 B2
(45) Date of Patent: Jul. 24, 2018

(54) FULL VOLTAGE SEGMENTED LINEAR CONSTANT-CURRENT LED DRIVE CIRCUIT IN AUTO SWITCHOVER MODE

(71) Applicant: CH LIGHTING TECHNOLOGY CO., LTD., Shaoxing, Zhejiang Province (CN)

(72) Inventor: Guosong Zhao, Shaoxing (CN)

(73) Assignee: CH LIGHTING TECHNOLOGY CO., LTD., Shaoxing (CN)

( * ) Notice: Subject to any disclaimer, the term of this patent is extended or adjusted under 35 U.S.C. 154(b) by 0 days.

(21) Appl. No.: 15/322,069

(22) PCT Filed: Apr. 19, 2016

(86) PCT No.: PCT/CN2016/079651
§ 371 (c)(1),
(2) Date: Dec. 23, 2016

(87) PCT Pub. No.: WO2017/067143
PCT Pub. Date: Apr. 27, 2017

(65) Prior Publication Data
US 2017/0318631 A1    Nov. 2, 2017

(30) Foreign Application Priority Data

Oct. 20, 2015  (CN) .......................... 2015 1 0684647

(51) Int. Cl.
*H05B 37/02* (2006.01)
*H05B 33/08* (2006.01)

(52) U.S. Cl.
CPC ....... *H05B 33/083* (2013.01); *H05B 33/0812* (2013.01)

(58) Field of Classification Search
CPC .............. H05B 33/083; H05B 33/0875; H05B 33/0878; H05B 33/0881; H05B 33/0887
(Continued)

(56) References Cited

U.S. PATENT DOCUMENTS 8,896,227 B2 *  11/2014  Moskowitz ........ H05B 33/0809
                                                315/209 R
9,426,859 B2 †   8/2016  Chen
(Continued)

FOREIGN PATENT DOCUMENTS

CN          101137261 A      3/2008
CN          103687174 A      3/2014
(Continued)

*Primary Examiner* — Thuy Vinh Tran
(74) *Attorney, Agent, or Firm* — Jiwen Chen

(57) ABSTRACT

The present invention discloses a full voltage segmented linear constant-current LED drive circuit in an auto switchover mode comprising a minimum of two groups of LEDs in series connection in proper sequence and a voltage detection and control circuit used for detection of an input power voltage from a power source, a positive terminal of each group of LEDs is connected to the power source via a change-over switch, a negative terminal of each group of LEDs is grounded via a control switch; wherein, one group of LEDs comprises a minimum of two LED units in series connection in proper sequence, a negative terminal of each LED unit is grounded via a control switch; the change-over switch and control switch are connected to and controlled by the voltage detection and control circuit to change intergroup series parallel connection mode and ON/OFF of different LED units.

2 Claims, 5 Drawing Sheets

(58) Field of Classification Search
USPC .................. 315/185 R, 291, 294, 299, 306
See application file for complete search history.

(56) References Cited

U.S. PATENT DOCUMENTS

| | | | |
|---|---|---|---|
| 2009/0187925 A1* | 7/2009 | Hu ..................... | H05B 33/0815 |
| | | | 719/327 |
| 2009/0190065 A1 | 7/2009 | Konno et al. | |
| 2011/0068702 A1* | 3/2011 | van de Ven ......... | H05B 33/083 |
| | | | 315/186 |
| 2013/0320868 A1* | 12/2013 | Kim .................... | H05B 33/083 |
| | | | 315/186 |
| 2015/0230298 A1 | 8/2015 | Chu et al. | |

FOREIGN PATENT DOCUMENTS

| | | | |
|---|---|---|---|
| CN | 103826366 A | † | 5/2014 |
| CN | 103929866 A | | 7/2014 |

\* cited by examiner
† cited by third party

FULL VOLTAGE SEGMENTED LINEAR CONSTANT-CURRENT LED DRIVE CIRCUIT IN AUTO SWITCHOVER MODE

This is a U.S. national stage application of PCT Application No. PCT/CN2016/079651 under 35 U.S.C. 371, filed Apr. 19, 2016 in Chinese, claiming Chinese priority Application No. 201510684647.5 filed Oct. 20, 2015, which are all hereby incorporated by reference.

FIELD OF THE INVENTION

The present invention is related to the lighting field, in particular to a LED drive circuit.

BACKGROUND ART

There are different power supply modes in different regions; normally, the input of a LED drive power supply in the lighting field comprises high-voltage power frequency AC (namely municipal power), low-voltage DC, high-voltage DC, low-voltage high frequency AC (such as output from electronic transformer) and so on. However, the output of the LED drive power supply is mainly represented by a constant-current source that can change voltage in accommodation with variation to LED forward voltage drop value.

Currently, there are two applicable drive modes: One is constant-voltage source for numerous constant-current sources with each constant-current source providing power supply to each LED independently. Such mode features in flexible combination, and any fault to one LED will not affect operation of other LEDs. Nevertheless, its cost is relatively higher. Another one is a direct constant-current power supply with LEDs in series or parallel connection for operation. It has such advantage as relatively low cost despite of poor flexibility. Furthermore, it is also expected to eliminate fault to one certain LED while ensuring operation of other LEDs. The two modes are in co-existence within a certain period of time. A power supply of multi constant-current output is probably the mainstream trend in the future owing to its low cost and excellent performance.

To accommodate different supply voltages, Chinese Patent Application No. 201310110690.1 discloses a LED drive device that can change the structure of series or parallel connection as per dynamic variation to input voltage to drive LED matrix. It comprises the following items: an input voltage sensing module used to compare the input voltage with different voltage range as preset, and output an input voltage status signal; a control module for the circuit structure in series or parallel connection used to output corresponding control signals to switch combination and constant-current sources available for dynamic change of total current according to input voltage status signals; a switch combination available for change of series and parallel structure of a LED matrix, which can change series and parallel structures of the LED matrix according to different control signal status; a constant-current source available for dynamic change of total current; it is available for dynamic change of total current of the constant-current source according to different control signal statuses in accommodation with the switch combination to maintain the current on the single series LED route within a constant current range. This has effectively eliminated bright and dark areas on LED light fixture, and further minimized strobe-flash to LED light fixture in case of conventional drive under Low DC voltage.

Chinese Patent Application No. 201310218352.X discloses a full voltage LED light in series and parallel connection, comprising at least two LED units, namely a LED drive circuit connected to each LED unit and a control circuit in series and parallel connection; wherein, the control circuit in series and parallel connection comprises at least a positive-pole change-over switch, a negative-pole change-over switch and a $1^{st}$ voltage detection and control circuit; furthermore, each positive-pole and negative-pole change-over switch is correspondingly connected between positive and negative poles of each LED unit; the $1^{st}$ voltage detection and control circuit will control ON/OFF of each positive-pole and negative-pole switch to realize mutual parallel connection of each LED unit once current low voltage is detected. On the contrary, it will make each LED unit be in series connection in case of high voltage; as total cut-in voltage is to be increased to the fully acceptable high voltage, each LED unit in series connection is unlikely to be burnt once lighted.

The problem with flexible compatibility with power factor and THD is to be settled despite of the fact that aforesaid prior arts can change series and parallel connection mode.

SUMMARY OF THE INVENTION

The present invention provides a LED drive circuit, which can flexibly change power factor, and reduce THD through reasonable configuration of LEDs in groups and units.

A full voltage segmented linear constant-current LED drive circuit in an auto switchover mode, comprising a minimum two groups of LED in parallel connection in proper sequence and a voltage detection and control circuit used for detection of power voltage;

Positive terminal of each group of LED is directly connected or indirectly connected to the power source via the change-over switch; negative terminal of each group of LED is grounded via a corresponding control switch;

Wherein, one group of LEDs comprises a minimum two groups of LED units in series connection in a proper sequence; a negative terminal of each LED unit is grounded via a corresponding control switch;

The change-over switch and control switch are connected to and controlled by the said voltage detection and control circuit to change inter-group parallel connection mode and ON/OFF of different LED units.

To accommodate 120V and 277V power supply modes, the present invention makes use of voltage detection and control circuit to identify voltage, and control change-over switch; the change-over switch is to be turned on in case of 277V power supply; it means that each group of LEDs is in series connection in proper sequence; similarly, the change-over switch is to be turned on in case of 110V power supply; input terminal of each group of LEDs is to be directly connected to the power source to realize series connection in accommodation with different voltages.

Voltage may be still subject to periodic fluctuation even if the power supply mode is confirmed. The present invention makes use of control switch to change ON/OFF status of some LED units, namely current and voltage drop of the whole drive circuit to reduce the THD below 15% (total harmonic distortion) in case of periodic fluctuation of voltage; more LED units are to be turned on accompanied by gradually increase of voltage. On the contrary, some LED units are to be turned off gradually in case of voltage drop.

Voltage sampling, comparison and output of corresponding signals are realized by the voltage detection and control circuit; the voltage detection and control circuit can make use of the chip written in the software to achieve such purpose, which can also make use of voltage comparison circuit with logic function to turn on corresponding change-over switch and control switch through judgment of power voltage.

According to present invention, each group of LED comprises at least one or more LEDs in series connection; in the group comprising numerous LED units, each LED unit comprises at least one or more LEDs in series connection in proper sequence.

ON/OFF status of control switch of each LED unit may affect ON status of follow-up LED unit; combination status of control switch for different LED units may change overall current periodically. In a preferred embodiment, an output terminal of the last LED unit in the same group shares the same control switch with the output terminal of a LED in the same group.

The number of LEDs in each LED unit group might be same or different; ON/OFF of LED groups of different quantities can realize more varied combination of current.

In a preferred embodiment, each control switch is grounded via corresponding sampling resistor, and is provided with a comparator respectively; sampling terminal of the comparator is connected to the sampling resistor, which is expected to input constant-current protection signal to the control switch, subjecting to comparison with benchmark signals.

A control switch, a sampling resistor and a comparator can also be deemed to constitute a current stabilizing control unit.

The change-over switch comprises a triode and a metal oxide semiconductor field effect transistor (MOS); wherein, a collector and a emitter of the triode are connected to the positive terminal of LED in corresponding group and positive terminal of power source; the base is connected to the power source via the $1^{st}$ voltage division resistor; drain of metal oxide semiconductor field effect transistor (MOS) is connected to the base of triode via the $2^{nd}$ voltage division resistor with source grounded; the grid is connected to the voltage detection and control circuit.

Voltage detection and control circuit can change voltage between the $1^{st}$ and $2^{nd}$ voltage division resistors (namely base of triode) through control of a metal oxide semiconductor field effect transistor (MOS), and thereby realize ON/OFF control of triode (ON/OFF of change-over switch).

In a preferred embodiment, the LED is divided into 2-4 groups; the total number of specification of LED in each group are basically identical; wherein, positive terminal of the 1st group of LED is connected to the power source; whereas the negative terminal is grounded via the control switch and sampling resistor;

A negative terminal of previous group of LED is connected to the positive terminal of the next group of the LED via anti-reflux diode; wherein, the last one or more groups of the LED is further divided into 2-4 LED units in series connection; negative terminal of each LED unit is grounded via corresponding control switch and sampling resistor; emitter of triode in each change-over switch is connected to the input terminal of corresponding group of LEDs.

In a preferred embodiment, the LED is divided into two groups; positive terminal of the 1st group of LEDs is connected to the power source; whereas negative terminal is grounded via the $1^{st}$ control switch and sampling resistor;

The second group of LEDs is divided into 3 LED units in series connection; negative terminal of each LED unit is grounded via the $2^{nd}$, $3^{rd}$ and $4^{th}$ control switches, the $2^{nd}$, $3^{rd}$ and $4^{th}$ sampling resistors.

In a preferred embodiment, for simplified circuit, the $1^{st}$ control switch and change-over switch are provided with the same metal oxide semiconductor field effect transistor (MOS), and the output terminal of the $1^{st}$ group of LEDs is connected between the $2^{nd}$ voltage division resistor and the drain of metal oxide semiconductor field effect transistor (MOS) via the diode.

To further regulate total load current in a flexible manner, in a preferred embodiment, the sampling resistor is in series connection with a distribution branch; the distribution branch comprises distribution resistors in mutual series connection and a distribution switch controlled by the voltage detection and control circuit.

In still a preferred embodiment, the $3^{rd}$ and $4^{th}$ sampling resistors are provided with a distribution branch in parallel connection.

In a preferred embodiment, negative terminal of the $2^{nd}$ sampling resistor is connected between the $3^{rd}$ control switch and the $3^{rd}$ sampling resistor; the negative terminal of the $3^{rd}$ sampling resistor is connected between the $4^{th}$ control switch and the $4^{th}$ sampling resistor.

The drive circuit according to the present invention can switch over series and parallel connection modes of LED according to voltage, which can also adjust total load current in time according to voltage fluctuation mode, and thereby reduce harmonic distortion, and cater to power factor.

PREFERRED EMBODIMENTS OF THE INVENTION

Figure 1:
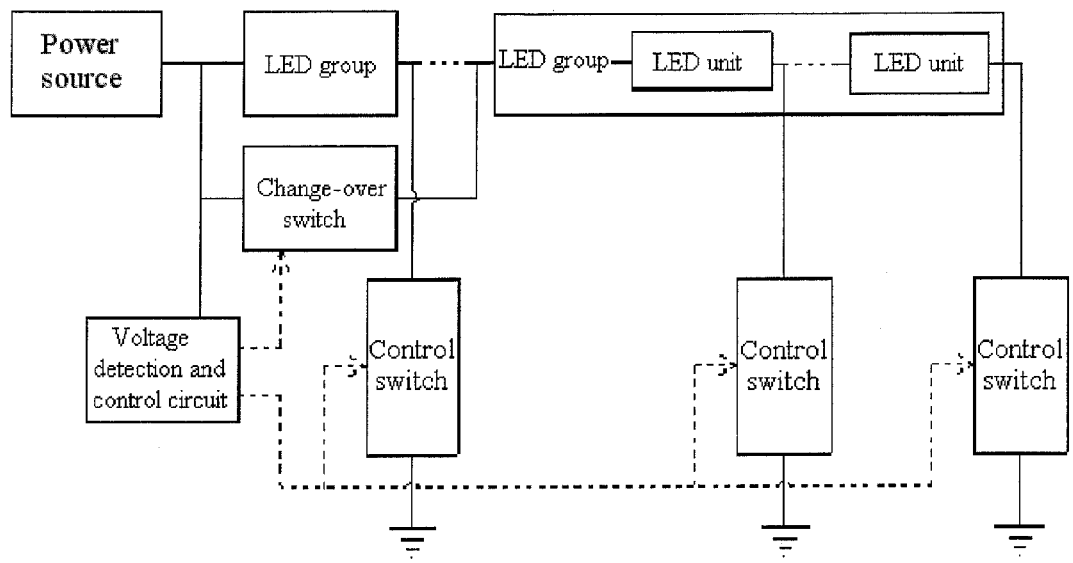
FIG. 1 is a functional block diagram of the present invention.

A full voltage segmented linear constant-current LED drive circuit in auto switchover mode according to the present invention as shown in FIG. 1, comprises multi groups of LEDs in series connection; wherein one group of LEDs comprises multi groups of LED units in series connection; positive terminals of the $1^{st}$ group of LEDs are directly connected to the power source; remaining groups are connected to the power source via corresponding change-over switches; a negative terminal of each group of LEDs is grounded via a corresponding control switch.

Voltage detection and control circuit aims to detect voltage on the output terminal of the power source, and accordingly control the change-over switch to change inter-group series connection mode.

The negative terminal of each LED unit is grounded via a corresponding control switch; the voltage detection and control circuit sends ON/OFF signals to the control switch to change ON/OFF status of different LED units in the group, and realize step variation to total current.

The LED drive circuit of the present invention is applicable to working mode of two different power voltages (for instance, 120V and 277V as well as 110V and 220V); this aims to ensure a small-volume LED constant-current circuit of high power, high power factor and low harmonic distortion under the two power voltages.

Supposing V1 and V2 AC input voltages provide constant-current drive for LED, reference voltage is to be set as V0 to satisfy the condition of V1<V<V2.

When current detection voltage V=V1<V0, output constant of the comparator will be 0 (or 1); signals output from the comparator may produce a constant voltage signal for logic control switch when passing through the locking circuit; such signals are favorable for series and parallel connection of LEDs in each group; whereas, it is applicable to compromise the efficiency and THD (or power factor) through ON/OFF switchover of LEDs in each unit.

When current detection voltage V=V2>V0, output of the comparator is to be changed to 1 (or 0) accordingly; signals output from the comparator may also produce a constant voltage signal for logic control switch when passing through the locking circuit; voltage signal for logic control switch is not to be changed (locked) once such case occurs for one time, even if V<V0. It is applicable to set V0=(V1+V2)/2 or slightly increase V0 during practical operation, alternatively, it is applicable to add filter circuit prior to circuit detection so as to minimize the probability for erroneous judgment of power voltage detection circuit.

Nevertheless, it is applicable to set two groups of LEDs in case of V2≈2V1; if power voltage V2 exceeds V1 by 2 times or more, we can change two groups of LEDs deemed as in parallel connection to three or more groups of LEDs under aforesaid V1 power voltage according to specified requirements; this aims to ensure normal operation of LEDs; the only difference is that the circuit becomes more complicated.

The present invention is applicable to 120V and 277V as well as 110V and 220V AC power voltage; it is requested that LED is to be available for normal operation under the two power voltages with efficiency and THD indicators satisfying more stringent requirements.

Embodiment 1

Figure 2:
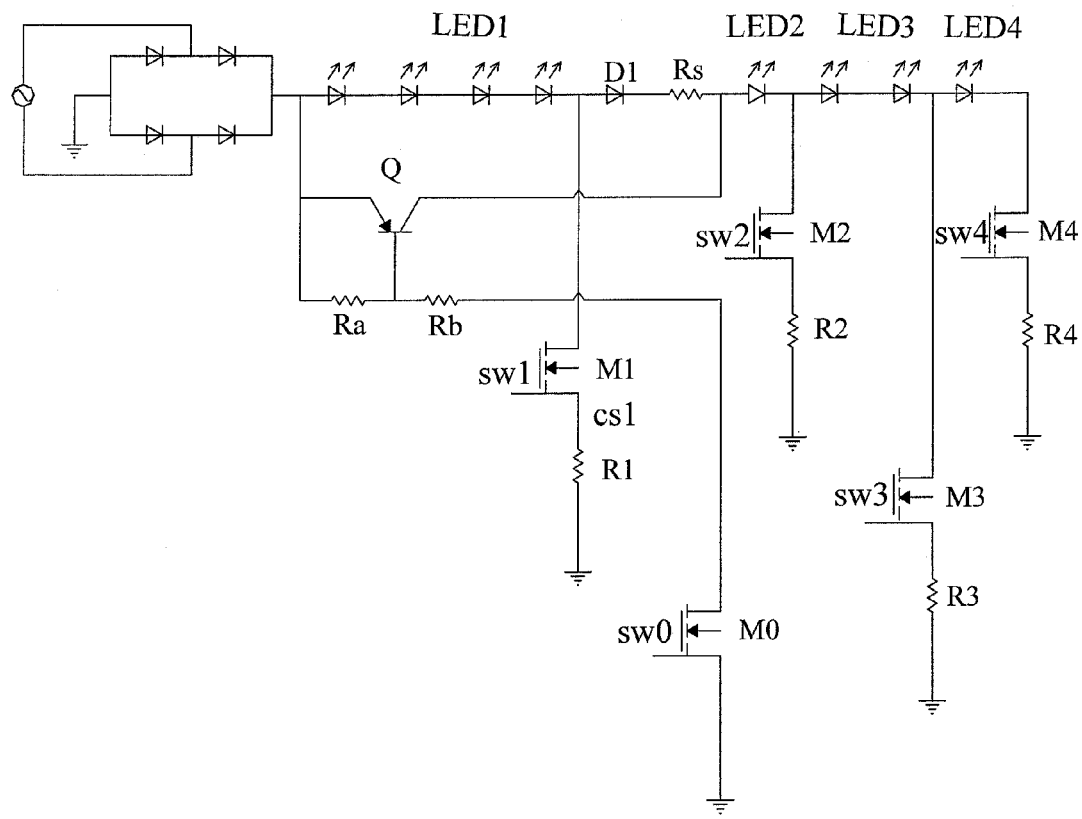
FIG. 2 is a diagram for the circuit according to Embodiment 1 of the present invention.

Referring to FIG. 2, it is applicable to set V0=200V in case of 120V and 277V AC voltages.

The output of AC power subjecting to rectification is as shown on the left side of the figure; all LEDs are divided into two groups; wherein the $1^{st}$ group is LED1 (specifically comprising 4 LEDs), and others fall into the $2^{nd}$ group; the $2^{nd}$ group is divided into three units, namely unit LED2 (specifically comprising 1 LED), unit LED3 (specifically comprising 2 LEDs) and unit LED 4 (specifically comprising 1 LED); all LEDs are in series connection in proper sequence; an anti-reflux triode D1 and resistor Rs are in series connection between the $1^{st}$ and $2^{nd}$ groups.

The change-over switch comprises a triode Q and MOS M0; wherein, the collector and emitter of triode Q are connected to the positive terminal of the $2^{nd}$ group of LED and output terminal of a power source; whereas the base is connected to the output terminal of the power source via the $1^{st}$ voltage division resistor Ra;

The drain of MOS M0 is connected to the base of triode Q via the $2^{nd}$ voltage division resistor Rb; the source is grounded; the grid is connected to the output terminal of voltage detection and control circuit.

The negative terminal of the $1^{st}$ group of LED is grounded via MOS M1 (equivalent to control switch) and a sampling resistor R1 in proper sequence.

Similarly, negative terminals of three LED units are grounded respectively via:

MOS M2 (equivalent to control switch) and a sampling resistor R2;

MOS M3 (equivalent to control switch) and a sampling resistor R3;

MOS M4 (equivalent to control switch) and a sampling resistor R4;

The voltage detection and control circuit (omitted in the figure) as shown in FIG. 2 aims to collect voltage from output terminal of the power source and current at the sampling resistor R1, R2, R3 and R4 for output of signal sw0 used to control the change-over switch and input of signal sw1, sw2, sw3 and sw4 for each control switch following corresponding treatment.

Figure 3:
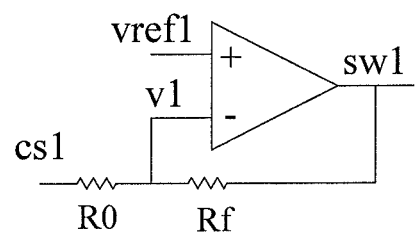
FIG. 3 is a structural diagram for the comparator and peripheral circuit.

Taking sampling signal cs1 at the sampling resistor R1 as shown in FIG. 3 for instance, it is converted by the resistor R0 and Rf into voltage signal v1 for comparison with benchmark voltage verf1 prior to output of signal sw1 to control ON/OFF of MOS M1.

Supposing V=120V during operation, as V is always below V0 (200V), MOS M0 controlled by voltage detection and control circuit is to be constantly open; it is applicable to set the size of the $1^{st}$ voltage division resistor Ra, the $2^{nd}$ voltage division resistor Rb to make sure that base voltage of triode Q is extremely low.

Furthermore, one makes sure that MOS M2 is always closed (without current) to ensure linear constant-current control of MOS M1, M3 and M4.

Figure 4:
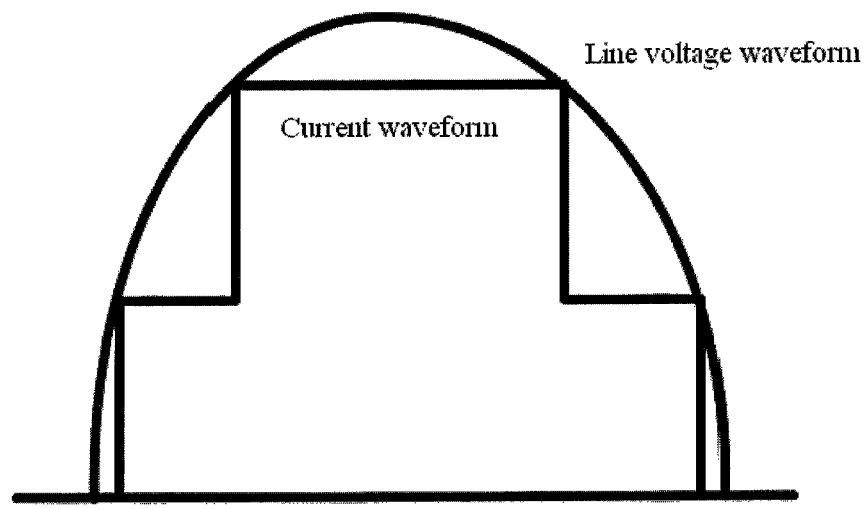
FIG. 4 is an oscillogram of 120V power voltage.

Referring to FIG. 4, MOS M0, M1 and M3 are to be connected after power-on; whereas MOS M2 and M4 are to be disconnected; in other words, LED in the $1^{st}$ group and the first two LED units in the $2^{nd}$ group are in operation; current on the output terminal of the power source will zoom at the moment.

Disconnecting MOS M3, and connecting MOS M4 accompanied by voltage rise; in other words, when all LEDs are connected, voltage on the output terminal of the power source will zoom again.

It is applicable to compromise efficiency and THD through aforesaid segmented control.

In another case, when V is 277V triode and MOS M0 and M1 are to be controlled for disconnection to realize series connection of all LEDs.

Figure 5:
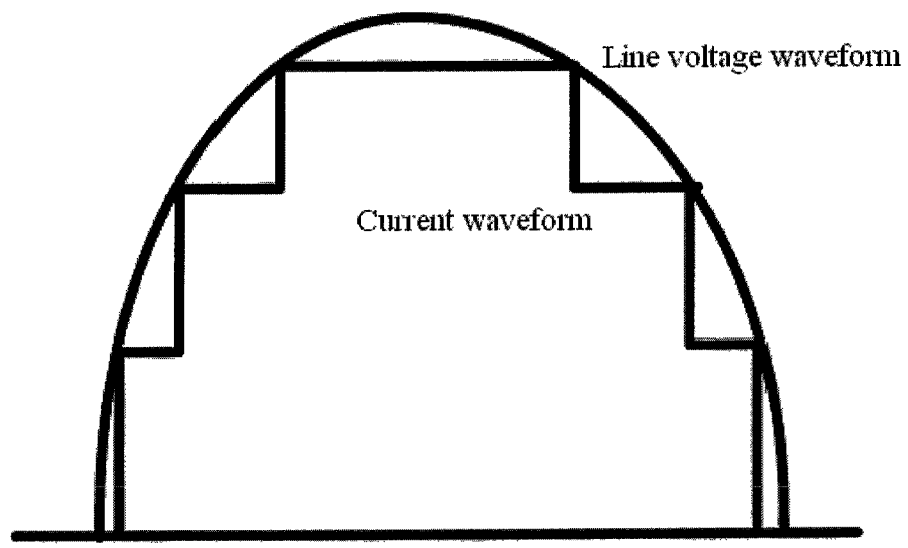
FIG. 5 is an oscillogram of 277V power voltage.

Referring to FIG. 5, accompanied by voltage fluctuation, MOS M2 and M3 are to be connected and disconnected respectively at the $1^{st}$ voltage zoom; in other words, only LEDs in the $1^{st}$ group and the $1^{st}$ unit are in operation.

After that, MOS M2 and M3 are to be disconnected and connected respectively; when MOS M4 is disconnected, LED in the $1^{st}$ and $2^{nd}$ units will start to work, and the current will zoom again.

In still further embodiment, MOS M2 and M3 are to be disconnected; when MOS M4 is connected, all LEDs will start to work, and the current will zoom again.

It is applicable to proceed with control in the same manner in case of voltage drop.

Furthermore, it is applicable to compromise power P, efficiency η and THD (or power factor PF) indicators under two power voltages through regulation of LED quantity in each group or unit as well as resistance of various sampling resistors and benchmark voltage (for instance, benchmark voltage verf1 in FIG. 3).

The resistor Rs can reduce power consumption of MOS M2, M3 and M4, and increase the linearity of LED. Of course, the resistor Rs can also be replaced by numerous LEDs in series connection; such LEDs are available for operation under the voltage of 277V to ensure higher LED efficiency under the voltage of 277V. Moreover, it is also essential to further solve the problem with excessive power consumption (it may probably result in burnout) of MOS M4 in case of input of high voltage. If it is required to minimize power consumption of MOS M2 and M3, it is applicable to reduce the quantity of unit LED3 and LED4 to realize voltage drop of MOS M2 and M3; it is applicable to add a current compensation circuit for MOS M4 while minimizing power consumption of MOS M4; the principle is stated as follows: it is applicable to reduce power consumption of MOS M4 by making use of compensation circuit to reduce the current to MOS M4 in case of input of high voltage.

Embodiment 2

In embodiment 1, the logic of MOS M0 and M1 can be deemed as being basically identical in case of 120V and 277V; the only difference is that MOS M1 is provided with current limiting function that is unavailable for MOS M0; such difference will not result in logic variation to other control switches.

Figure 6:
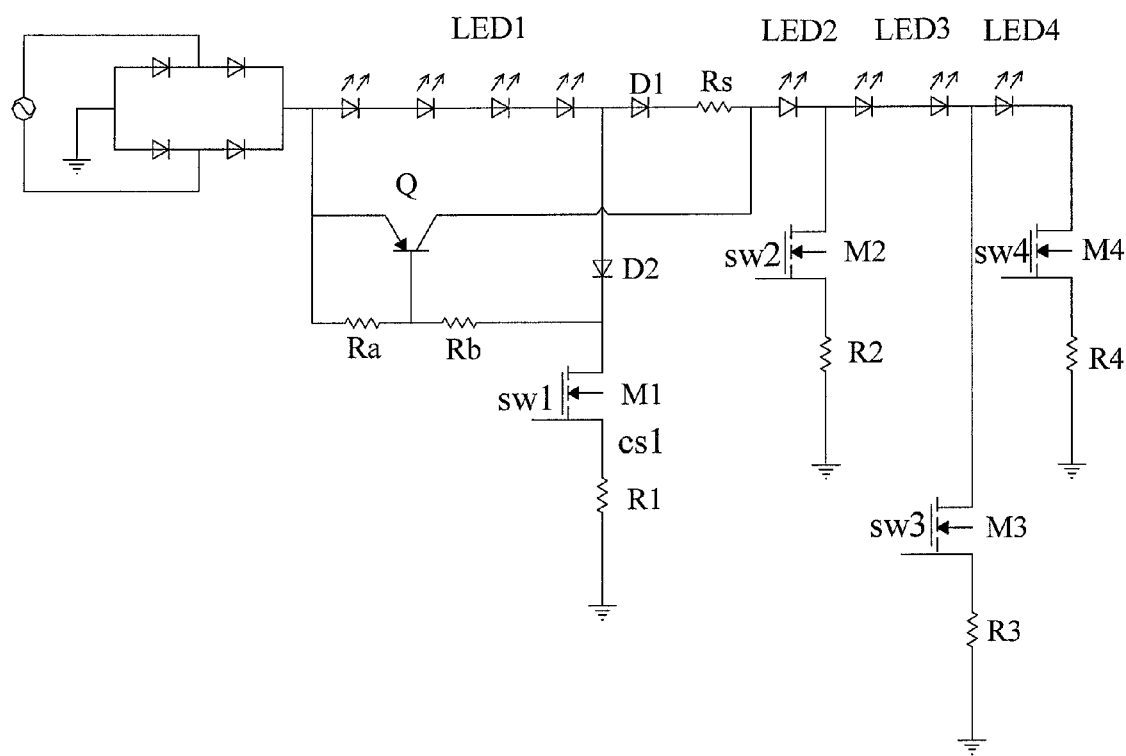
FIG. 6 is a diagram for the circuit according to Embodiment 2 of the present invention.

Referring to FIG. 6, MOS M0 and M1 in the embodiment is replaced by only one MOS; such MOS can be MOS M1; to guard against reflux, diode D2 his provided between negative terminal of the 1$^{st}$ group of LEDs and MOS M1. This can simplify peripheral circuit, and reduce cost for peripheral circuits.

Embodiment 3

Referring to FIG. 6, grounding mode for the control switch of each LED unit in this embodiment is different from that in Embodiment 2; in other words, the current limiting value is different.

As shown in the figure, the negative terminal of resistor R2 is connected between MOS M3 and sampling resistor R3; whereas the negative terminal of sampling resistor R3 is connected between MOS M4 and sampling resistor R4.

As compared with linear voltage detection, such structure has the following advantage: As several MOSs are available for auto switchover regardless of output voltage from the power source, it is applicable to define the number of LEDs more freely.

Embodiment 4

According to aforesaid embodiments, it is relatively difficult to make total power P of LED equal under the two voltages (supposing it is 120V and 277V).

Furthermore, in Embodiment 3, if higher efficiency and THD are required, it may result in unreasonable current value (in other words, current distribution on certain LED section might be extremely low or high as compared with that on other LED sections) to certain LED section due to higher relativity of current passing through LED in each unit.

Figure 7:
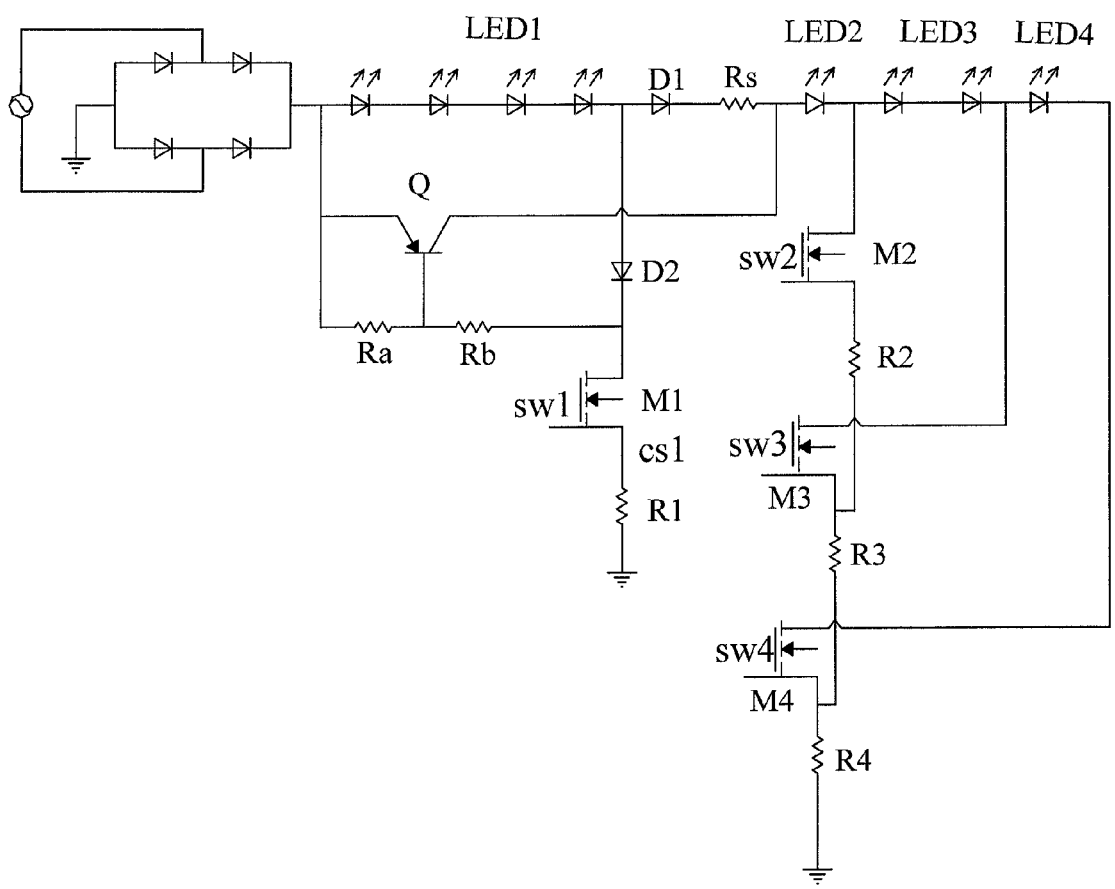
FIG. 7 is a diagram for the circuit according to Embodiment 3 of the present invention.
Figure 8:
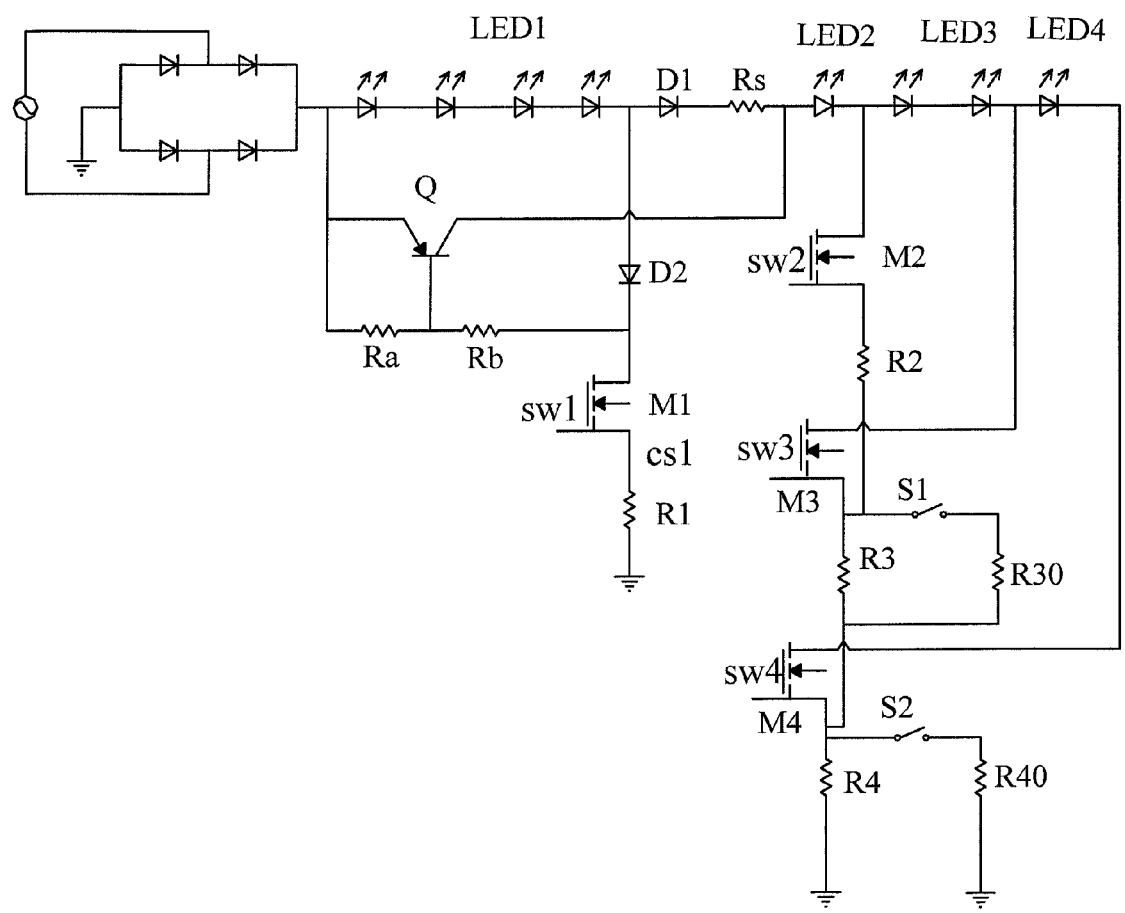
FIG. 8 is a diagram for the circuit according to Embodiment 4 of the present invention.

Referring to FIG. 7, the embodiment can improve such deficiency, which can ensure high efficiency, high power factor and low harmonic distortion under the two power voltages.

In the figure, sampling resistors R3 and R4 are provided with distribution resistors R30 and R40 in parallel connection; furthermore, distribution branches in parallel connection are provided with switches S1 and S2; wherein, switches S1 and S2 are controlled by a voltage detection and control circuit.

Working principle: It is applicable to turn off switch S1 and turn on switch S2 when power voltage is 120V.

As power of LED is Pled=I(current)*Vled (voltage), it can roughly define total average voltage drop ratio of LED corresponding to power voltage of 277V and 120V as follows:

$Vledv2/Vledv1 \approx V2/V1 = 277/60 \approx 4.6$

Setting R40≈3R4 and R30≈0; Rs is to be replaced by LED.

Therefore, to make sure that LED power corresponding to voltage 277V and 120V is Pledv1=Pledv2, total average current ratio of LED under the two voltages is to be defined as Iledv1/Iledv2≈4.6; for this purpose, we hereby set Vref2 (corresponding to benchmark voltage of MOS M2) under such circumstance as 2.3*Vref1 (corresponding to benchmark voltage of MOS M1) to make power P under the two power voltages more approximate.

It is applicable to turn on switch S2, and turn off switch S1 when power voltage is 277V; change Vref2 to another value of Vref2=Vref1 under such circumstance.

Such switchover mode can significantly improve current freedom on each section under the two voltages; when THD is relatively higher, difference to current of each section of LED series under the two voltages is to be minimized with power being regulated to the approximate value.

As discovered through simulation debugging, it is recommended that distribution resistor R30 is approximate to 0 theoretically; therefore, switch S1 and distribution resistor R30 can be replaced by one MOS switch integrated inside the chip; this can further reduce the cost. In a word, such structure can compromise power and THD indicators under the two voltages, which will not make current passing through each section of LED deviate by several times.

In the embodiment, if adequate LEDs are provided, it is applicable to obtain ideal THD and efficiency on condition that sampling resistor and distribution resistor of approximate size are given; meanwhile, difference to current passing through each section of LED is to be minimized; Moreover, the power of LED is approximate under the two voltages; whereas cost for peripheral circuits is also acceptable.

The invention claimed is:

1. A full voltage segmented linear constant-current LED drive circuit in an auto switchover mode, comprising a minimum of two groups of LEDs in series connection and a voltage detection and control circuit, characterized in that:
   positive terminals of each group of LEDs are connected to a power source via a change-over switch; negative terminals of each group of LEDs are grounded via corresponding control switches;
   wherein, one of the minimum of two groups comprises a minimum of two LED units in series connection; a negative terminal of each LED unit is grounded;
   the change-over switch is connected to and controlled by the voltage detection and control circuit; the voltage detection and control circuit detects a power voltage from an output terminal of the power source and control the change-over switch accordingly to change inter-group connection mode and ON/OFF of respective LED units;
   wherein each group of LEDs comprises at least one or more LEDs in series connection; in the group comprising the minimum of two LED units, each LED unit comprises at least one or more LEDs in series connection;
   wherein each control switch of the minimum of two groups of LEDs is grounded via a sampling resistor, and is provided with a comparator; a sampling terminal of the comparator is connected to the sampling resistor, which aims to input constant-current protection signals to the corresponding control switch after comparison with benchmark signals;

wherein the change-over switch comprises a triode and a metal oxide semiconductor field effect transistor (MOS); wherein, a collector and an emitter of the triode are respectively connected to the positive terminal of the one of the minimum of two groups of LEDs and the positive terminal of the power source; the base of the triode is connected to the power source via a first voltage division resistor; and a drain of the metal oxide semiconductor field effect transistor (MOS) is connected to the base of the triode via a second voltage division resistor, and a source of the MOS is grounded; a gate of the MOS is connected to the voltage detection and control circuit wherein the voltage detection and control circuit aims to collect the power voltage from the output terminal of the power source and currents from the sampling resistors and output a control signal to the gate of the MOS.

2. The full voltage segmented linear constant-current LED drive circuit in an auto switchover mode according to claim 1, characterized in that the minimum of two groups of LEDs are divided into 2-4 groups; the total number of LEDs in each group is identical; wherein, positive terminals of a first group of LEDs are connected to the power source; whereas negative terminals of the first group of LEDs are grounded via the control switch and sampling resistor; wherein the negative terminals of a previous group of LEDs are connected to the positive terminals of the next group of LEDs via an anti-reflux diode; wherein, the last one or more groups of LEDs is further divided into 2-4 LED units in series connection; negative terminal of each LED unit is grounded via a respective control switch and a sampling resistor.

* * * * *